United States Patent
Teng

(10) Patent No.: US 8,009,774 B2
(45) Date of Patent: Aug. 30, 2011

(54) DEVICES FOR CARRIER RECOVERY AND RELATED METHODS

(75) Inventor: Chih-Yuan Teng, Taichung (TW)

(73) Assignee: Princeton Technology Corporation, Taipei County (TW)

( * ) Notice: Subject to any disclaimer, the term of this patent is extended or adjusted under 35 U.S.C. 154(b) by 691 days.

(21) Appl. No.: 12/107,541

(22) Filed: Apr. 22, 2008

(65) Prior Publication Data

US 2009/0060099 A1 Mar. 5, 2009

(30) Foreign Application Priority Data

Sep. 5, 2007 (TW) .............................. 96133027 A

(51) Int. Cl.
*H04D 1/00* (2006.01)

(52) U.S. Cl. ........................................................ 375/343

(58) Field of Classification Search ................... 375/142, 375/143, 150, 152, 316, 326, 338, 339, 343, 375/350; 704/216, 218, 237, 263; 708/5, 708/422, 813; 342/108, 145, 189, 378
See application file for complete search history.

(56) References Cited

U.S. PATENT DOCUMENTS

| 6,377,640 B2 * | 4/2002 | Trans ............................ 375/354 |
| 7,724,833 B2 * | 5/2010 | Yang et al. .................... 375/260 |
| 2008/0225997 A1 * | 9/2008 | Yang et al. .................... 375/344 |

* cited by examiner

*Primary Examiner* — Sam K Ahn
(74) *Attorney, Agent, or Firm* — Muncy, Geissler, Olds & Lowe, PLLC

(57) ABSTRACT

Devices for carrier recovery and related methods are provided. A receiving signal is provided to perform an interpolation filtering process and a frequency multiplication sampling process. The receiving signal is then processed with a dealing signal. The dealing signal is generated by shifting a PN code with a frequency offset.

18 Claims, 3 Drawing Sheets

DEVICES FOR CARRIER RECOVERY AND RELATED METHODS

BACKGROUND OF THE INVENTION

1. Field of the Invention

The disclosure relates generally to devices for carrier recovery and related methods, and, more particularly to devices for carrier recovery and related methods for use in DMB-T (Digital Multimedia Broadcast-Terrestrial) systems.

2. Description of the Related Art

Currently, DMB-T defines a digital data transmission standard in China. DMB-T adopts modulation technology of TDS-OFDM (Time Domain Synchronous-Orthogonal Frequency Division Multiplexing). The DMB-T system has a layered-structure of frames. A frame group is a group of frames, wherein the first frame is the frame group header. A super frame defines a group of frame groups. The top layer of the frame structure is called a CDF (Calendar Day Frame). The physical channel is synchronized with absolute time. Signal frames are basic units in DMB-T.

The baseband signal of a frame body is an OFDM block. An OFDM block can be further divided into a guard interval and an IDFT (Inverse Discrete Fourier Transform) block. For TDS-OFDM, PN (Pseudo Noise) synchronization sequence is used as the guard interval for flame synchronization and OFDM, and the frame body is used as the DFT block. Since the PN sequence and the DFT block are OTDM (Orthogonal Time Division Multiplexing), and the PN sequence is a known sequence for the receiving end, and the PN sequence and the DFT block can be separated at the receiving end.

For digital communication or broadcast systems with synchronous transmission, frequency deviation may occur in receiving signals due to Doppler effect and local carrier errors, thus reducing the performance of the communication systems, and causing unexpected and dangerous results. Therefore, for OFDM signals composed of many orthogonal carriers, the bandwidth of sub-channels is much smaller than the entire bandwidth. The frequency offset of carriers will effect the orthogonal of sub-carriers and cause inter-carrier interference. A small frequency offset will cause a serious signal-to-interference ratio.

Conventional transmission methods have the following drawbacks.

(1) The results of CFE (Coarse Frequency Estimation) and de-correlation AFC (Auto Frequency Control) have large errors. A CFE estimator comprises a sequence of a square circuit, a delay circuit and a conjugate operation circuit series-connected, and a sequence of a multiplication circuit, an accumulator and a modulation circuit series-connected. The two inputs of the multiplication circuit are respectively connected with the outputs of the square circuit and a multiplication circuit series-connected. The square circuit has an input to receive a PN sequence. The delay length of the delay circuit is $I_1$. The accumulation length of the accumulator is the length K of the PN sequence. The inputs of the modulation circuit are signals output from the accumulator. The modulation circuit performs modulation, and multiplies a coefficient of $\frac{1}{2}*I_1$ to the modulated signal. The output signal of the modulation circuit is the CFE of a current frame. A de-correlation AFC estimator comprises a sequence of a square circuit, a delay circuit and a conjugate operation circuit series-connected, and a sequence of a multiplication circuit, an accumulator and a modulation circuit series-connected. The square circuit has an input to receive a PN sequence. The delay length of the delay circuit is $I_2$. The two inputs of the multiplication circuit are respectively connected with the outputs of the square circuit and the conjugate operation circuit. The accumulation length of the accumulator is the length K of the PN sequence. The inputs of the modulation circuit are signals output from the accumulator. The modulation circuit performs modulation, and multiplies a coefficient of $\frac{1}{2}*I_2$ to the modulated signal. The output signal of the modulation circuit is the de-correlation AFC of the current frame.

(2) In simulation, when the local PN code and the received baseband signals are correlated for frame synchronization, the frequency shift between the transmitting end and the receiving end exceeds 20k. No obvious peak can be located in a frame header signal PN420 with a frame header mode length of 420 symbols for frame synchronization. When the frequency shift exceeds 10k, frame synchronization will fail for a frame header signal PN945 with a frame header mode length of 945 symbols. It is difficult to distinguish the frame header and the frame body, such that no appropriate PN sequence can be found for CFE and de-correlation AFC.

(3) Even if frame synchronization can be accurately found, the results of CFE and de-correlation AFC may also have large errors if multi-path effect exists or the signal-to-noise ratio is low, thus causing subsequent time synchronizations and the entire reception process to fail.

Therefore, it is an important issue to correct frequency shifts in communication broadcasts.

BRIEF SUMMARY OF THE INVENTION

An objective of the invention is to provide devices for carrier recovery and related methods.

In an embodiment of a carrier recovery method, an interpolation filtering process and a frequency multiplication sampling process is performed on a receiving signal. The receiving signal is then processed with a dealing signal. The dealing signal is generated by shifting a PN code with a frequency offset.

An embodiment of a device for carrier recovery for use in a receiving end of a DMB-T system comprises a filter, a correcting device, a sampler, and a correlation device. The filter receives a receiving signal, and performs an interpolation filtering process to the receiving signal. The correcting device is coupled to the filter to correct the receiving signal. The sampler is coupled to the correcting device to perform a frequency multiplication sampling process to the receiving signal. The correlation device is coupled to the sampler to process the receiving signal and a dealing signal with a correlation operation. The dealing signal is generated by shifting a PN code with a frequency offset.

Devices for carrier recovery and related methods may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Devices for carrier recovery and related methods are provided.

Figure 1:
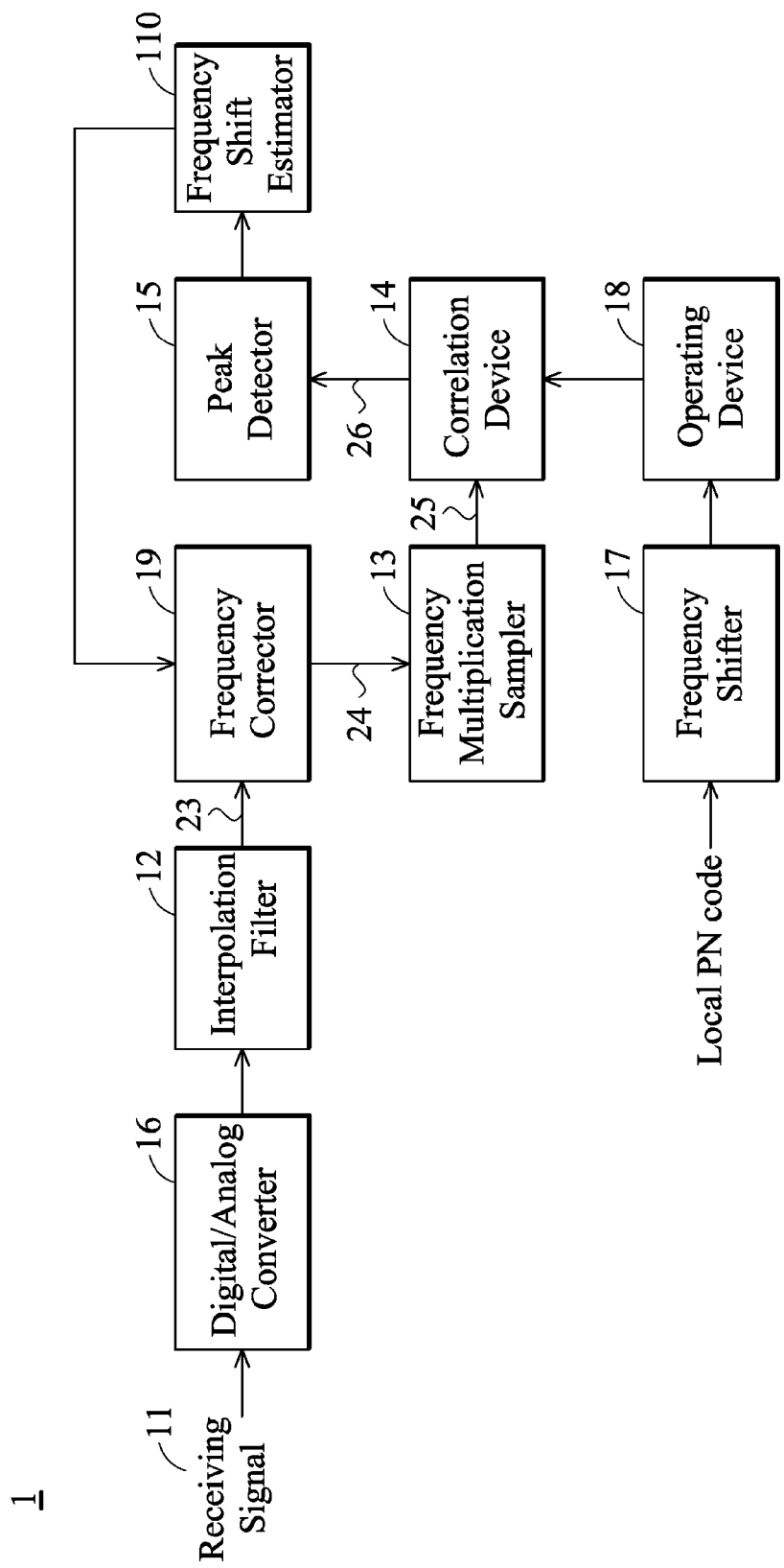
FIG. 1 is a schematic diagram illustrating an embodiment of a device for carrier recovery.

FIG. 1 is a schematic diagram illustrating an embodiment of a device for carrier recovery. As shown in FIG. 1, the device for carrier recovery 1 comprises a receiving signal 11, an interpolation filter 12, a frequency multiplication sampler 13, a correlation device 14, a peak detector 15, a digital to analog converter 16, a frequency shifter 17, an operating device 18, a frequency corrector 19, and a frequency shift estimator 110.

After the receiving signal 11 has been received by a receiving end (not shown), the receiving signal 11 is input to the interpolation filter 12. The interpolation filter 12 performs an interpolation filtering process to the receiving signal 11 and outputs an interpolation filtering signal 23. The frequency corrector 19 is coupled to the interpolation filter 12, and corrects the frequency of the receiving signal 11 according to a feedback signal generated by the frequency shift estimator 110; the output of the frequency corrector 19 is a correcting signal 24.

The frequency multiplication sampler 13 is coupled to the frequency corrector 19 to receive the receiving signal 11 after the interpolation filtering process has been completed. The frequency multiplication sampler 13 performs a frequency multiplication sampling process to the receiving signal 11 and outputs a frequency multiplication sampling signal 25. In this embodiment, the frequency multiplication sampler 13 may be a double frequency multiplication sampler, but is not limited thereto.

The frequency shifter 17 receives a local PN code, and shifts the local PN code with a frequency offset. The method for shifting the local PN code is as follows.

Figure 2:
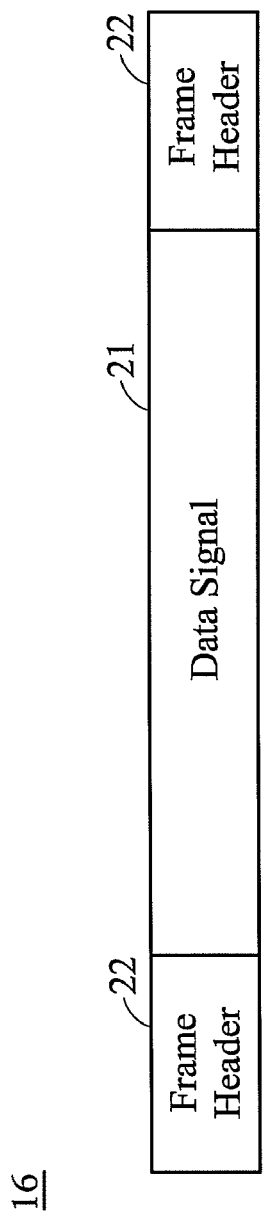
FIG. 2 is a schematic diagram illustrating an embodiment of a dealing signal.

First, the local PN code is stored to the memory in a format comprising a data signal and two frame headers. Referring to FIG. 2, a schematic diagram illustrating an embodiment of a dealing signal, the dealing signal 16 is the local PN code, and comprises a data signal 21 in the middle, and frame header signals 22 at two ends.

Then, the dealing signal is processed with a two-step frequency shifting process by the frequency shifter 17. In the first step, the base interval of frequency shifting is 40k. For example, the dealing signal is shifted by −320k, −280k, −240k, . . . , 280k, and 320k. A correlation operation to obtain related processing values is performed on the respective dealing signals with frequency offsets and the receiving signal 11. The maximum of the processing values is located.

In the second step, the shifted dealing signal having the corresponding maximum processing value is further processed with a frequency shifting process to find an appropriate frequency offset. The base interval of frequency shifting is 4k. For example, if the frequency offset corresponding to the maximum processing value is 280k, the dealing signal is further shifted by 260k, 264k, 268k, . . . , 292k, 296k, and 300k. Similarly, a correlation operation to obtain related processing values is performed on the respective dealing signals with frequency offsets and the receiving signal 11. The maximum of the processing values is further located. In this way, the error of the frequency shifting process is within −2k to 2k.

It is understood that the above based intervals of frequency shifting are 40k and 4k. The invention, however, is not limited thereto.

The formula for the frequency shifting process is $$E^{j2\pi \frac{fo}{fs} n},$$

where fs is the symbol rate of the local PN code, fo is the frequency offset, and the value after the formula is the dealing signal.

Further, before a correlation operation is performed on the dealing signal, a sign operation, such that the dealing signal is in the sign mode to be processed with the receiving signal in the correlation operation, is performed on the operating device 18. In this way, no multiplication is used, and only addition and subtraction are used during the correlation operation, thus reducing the use of hardware and related costs, and improving operating speed.

The correlation device 14 is coupled to the frequency shifter 17. It is noted that if the operating device 18 exists, the correlation device 14 is coupled to the operating device 18. The correlation device 14 performs the correlation operation to the receiving signal 11 and outputs a correlation signal 26, wherein the target to be processed is the dealing signal.

The peak detector 15 is coupled to the correlation device 14 to receive the corrected receiving signal 11, and detect at least one peak from the receiving signal 11. The peak detector 15 comprises a threshold value. The peak detector 15 obtains an absolute value of the receiving signal 11 output from the correlation device. When the absolute value exceeds the threshold value, the peak detector 15 determines the absolute value is a peak, and determines a carrier offset according to the peak.

The frequency shift estimator 110 is coupled to the peak detector 15 and the frequency corrector 19. The frequency shift estimator 110 can be used for carrier recovery and time synchronization, thus providing a simplified and time-domain-frequency-estimation based method and system for calculating carrier recovery. The frequency estimation comprises three steps. First, since frequency deviation may exist between the receiving end and the transmitting end in the initial state, CFE is first performed, thus adjusting frequency deviation to a smaller range. Second, de-correlation AFC is performed when time messages are not completely obtained. Third, when the time messages are completely obtained, that is, the receiving end enters a lock state, correlation AFC is performed. Thereafter, the value obtained by the frequency shift estimator 110 is fed back to the interpolation filter 12 for frequency correction.

Figure 3:
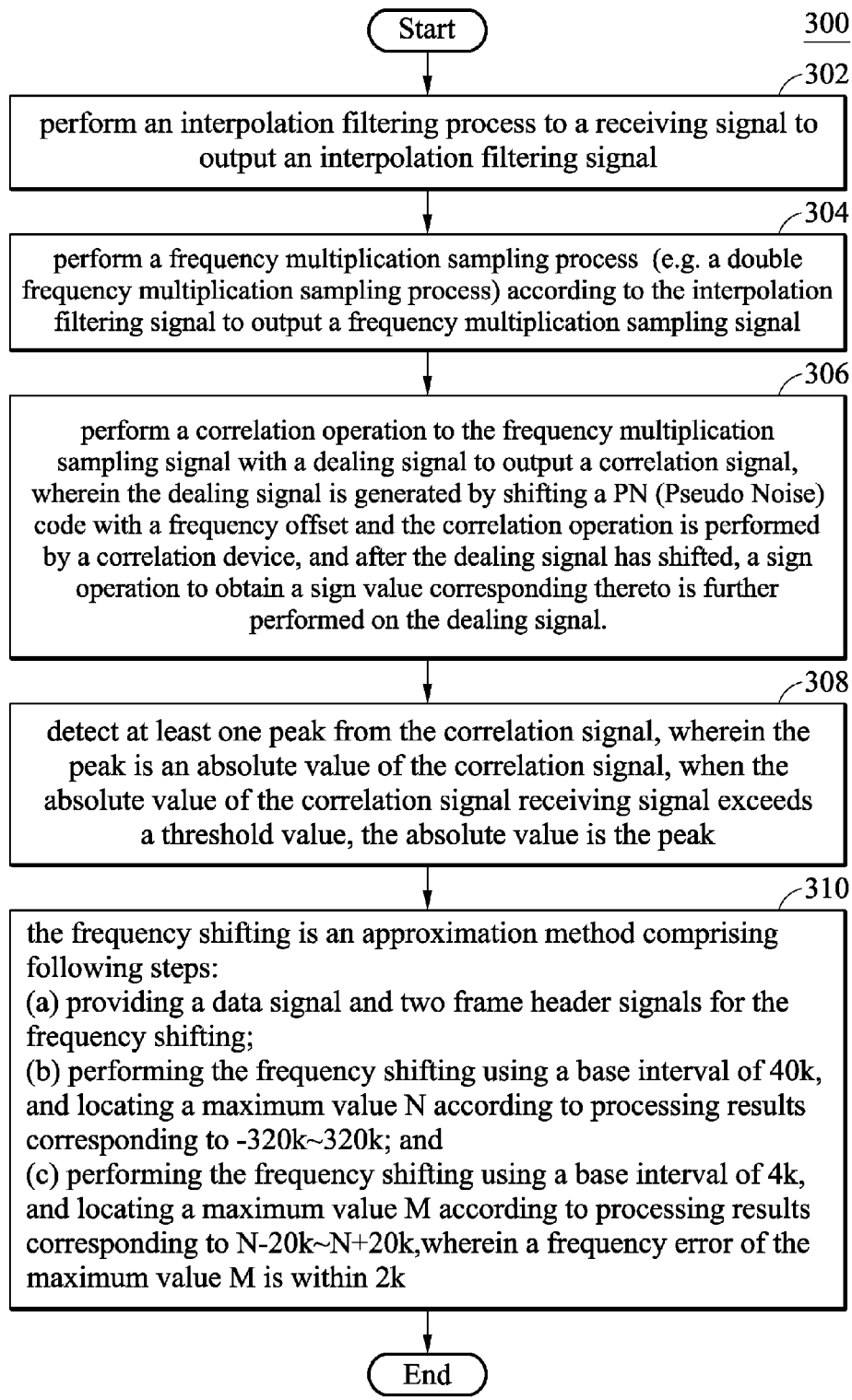
FIG. 3 is a schematic diagram illustrating a carrier recovery method.

FIG. 3 shows an exemplary flow diagram 300 illustrating a carrier recovery method according to one embodiment of the invention. The method may be used in a device for carrier recovery for use in a receiving end of a DMB-T system. First, in step 302, the device performs an interpolation filtering process to a receiving signal to output an interpolation filtering signal. Then, in step 304, the device performs a frequency multiplication sampling process (e.g. a double frequency multiplication sampling process) according to the interpolation filtering signal to output a frequency multiplication sampling signal. In this embodiment, the frequency multiplication sampling process may be performed by a double frequency multiplication sampler, but is not limited thereto.

In step 306, the device performs a correlation operation to the frequency multiplication sampling signal with a dealing signal to output a correlation signal, wherein the dealing signal is generated by shifting a PN (Pseudo Noise) code (e.g. a local PN code) with a frequency offset and the correlation operation is performed by a correlation device. After the dealing signal has shifted, a sign operation to obtain a sign value corresponding thereto is further performed on the dealing signal. In step 308, the device detects at least one peak from the correlation signal, wherein the peak is an absolute value of the correlation signal, and when the absolute value of the correlation signal receiving signal exceeds a threshold value, the absolute value is the peak. The frequency shifting in step 306 may be an approximation method comprising following steps (step 310):

(a) providing a data signal and two frame header signals for the frequency shifting;
(b) performing the frequency shifting using a base interval of 40k, and locating a maximum value N according to processing results corresponding to −320k-320k; and
(c) performing the frequency shifting using a base interval of 4k, and locating a maximum value M according to processing results corresponding to N−20k~N+20k, wherein a frequency error of the maximum value M is within 2k.

As described, the carrier recovery methods and devices of the application can effectively reduce the errors in frame synchronization due to transmission interferences. The local PN code and the dealing signal after frequency shifting can be used for correlation operations, thus to correct the errors during carrier recovery, and reduce the use of hardware and the related operating time. Therefore, simplifying frame synchronization and time synchronization. Additionally, the frequency error between the transmitting end and the receiving end will be within 2k, thereby possessing industry values.

Devices for carrier recovery and related methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Wile the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A carrier recovery method, comprising:
performing an interpolation filtering process to a receiving signal to output an interpolation filtering signal;
performing a frequency multiplication sampling process according to the interpolation filtering signal to output a frequency multiplication sampling signal; and
performing a correlation operation to the frequency multiplication sampling signal with a dealing signal to output a correlation signal,
wherein the dealing signal is generated by shifting a PN (Pseudo Noise) code with a frequency offset, the interpolation filtering process is performed by a filter, the frequency multiplication sampling process is performed by a sampler, and the correlation operation is performed by a correlation device.

2. The method of claim 1, wherein the frequency shifting is an approximation method comprising a plurality of steps.

3. The method of claim 2, wherein the approximation method comprises the steps of:
(a) providing a data signal and two frame header signals for the frequency shifting;
(b) performing the frequency shifting using a base interval of 40k, and locating a maximum value N according to processing results corresponding to −320k~320k; and
(c) performing the frequency shifting using a base interval of 4k, and locating a maximum value M according to processing results corresponding to N−20k~N+20k,
wherein a frequency error of the maximum value M is within 2k.

4. The method of claim 1, wherein after the dealing signal has shifted, a sign operation to obtain a sign value corresponding thereto is further performed on the dealing signal.

5. The method of claim 1, wherein the frequency multiplication sampling process is a double frequency multiplication sampling process.

6. The method of claim 1, further comprising detecting at least one peak from the correlation signal.

7. The method of claim 6, wherein the peak is an absolute value of the correlation signal.

8. The method of claim 7, wherein when the absolute value of the correlation signal exceeds a threshold value, the absolute value is the peak.

9. The method of claim 1, wherein the PN code is a local PN code.

10. A device for carrier recovery for use in a receiving end of a DMB-T (Digital Multimedia Broadcast-Terrestrial) system, comprising:
a filter, receiving a receiving signal, performing an interpolation filtering process to the receiving signal, and outputting an interpolation filtering signal;
a correcting device coupled to the filter, correcting the interpolation filtering signal and outputting a correcting signal;
a sampler coupled to the correcting device, performing a frequency multiplication sampling process to the correcting signal and outputting a frequency multiplication sampling signal; and
a correlation device coupled to the sampler, processing the frequency multiplication sampling signal and a dealing signal with a correlation operation and outputting a correlation signal,
wherein the dealing signal is generated by shifting a PN (Pseudo Noise) code with a frequency offset.

11. The device of claim 10, wherein the frequency shifting is an approximation method comprising a plurality of steps.

12. The device of claim 11, wherein the approximation method comprises the steps of:
(a) providing a data signal and two frame header signals for the frequency shifting;
(b) performing the frequency shifting using a base interval of 40k, and locating a maximum value N according to processing results corresponding to −320k~320k; and
(c) performing the frequency shifting using a base interval of 4k, and locating a maximum value M according to processing results corresponding to N−20k~N+20k,
wherein a frequency error of the maximum value M is within 2k.

13. The device of claim 10, wherein after the dealing signal has shifted, a sign operation to obtain a sign value corresponding thereto is further performed on the dealing signal.

14. The device of claim 10, wherein the frequency multiplication sampling process is a double frequency multiplication sampling process.

15. The device of claim 10, further comprising a peak detector coupled to the correlation device, detecting at least one peak from the correlation signal.

16. The device of claim 15, wherein the peak is an absolute value of the correlation signal.

17. The device of claim 16, wherein when the absolute value of the correlation signal exceeds a threshold value, and the absolute value is the peak.

18. The device of claim 10, wherein the PN code is a local PN code.

* * * * *